(No Model.) 2 Sheets—Sheet 1.
G. B. SNOW
WINDMILL.
No. 498,584. Patented May 30, 1893.
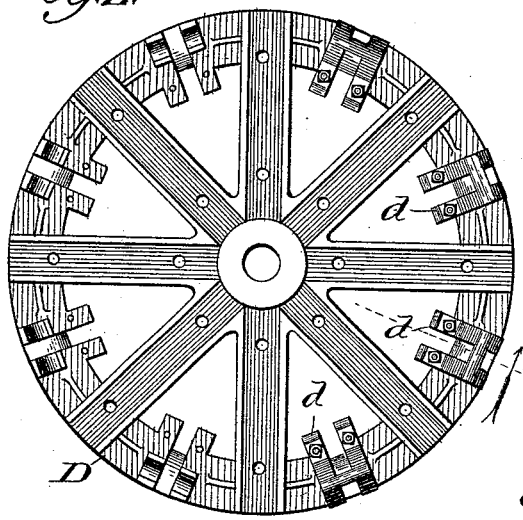
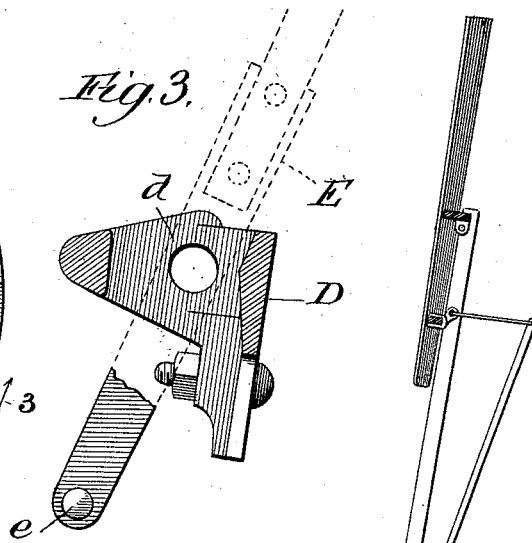
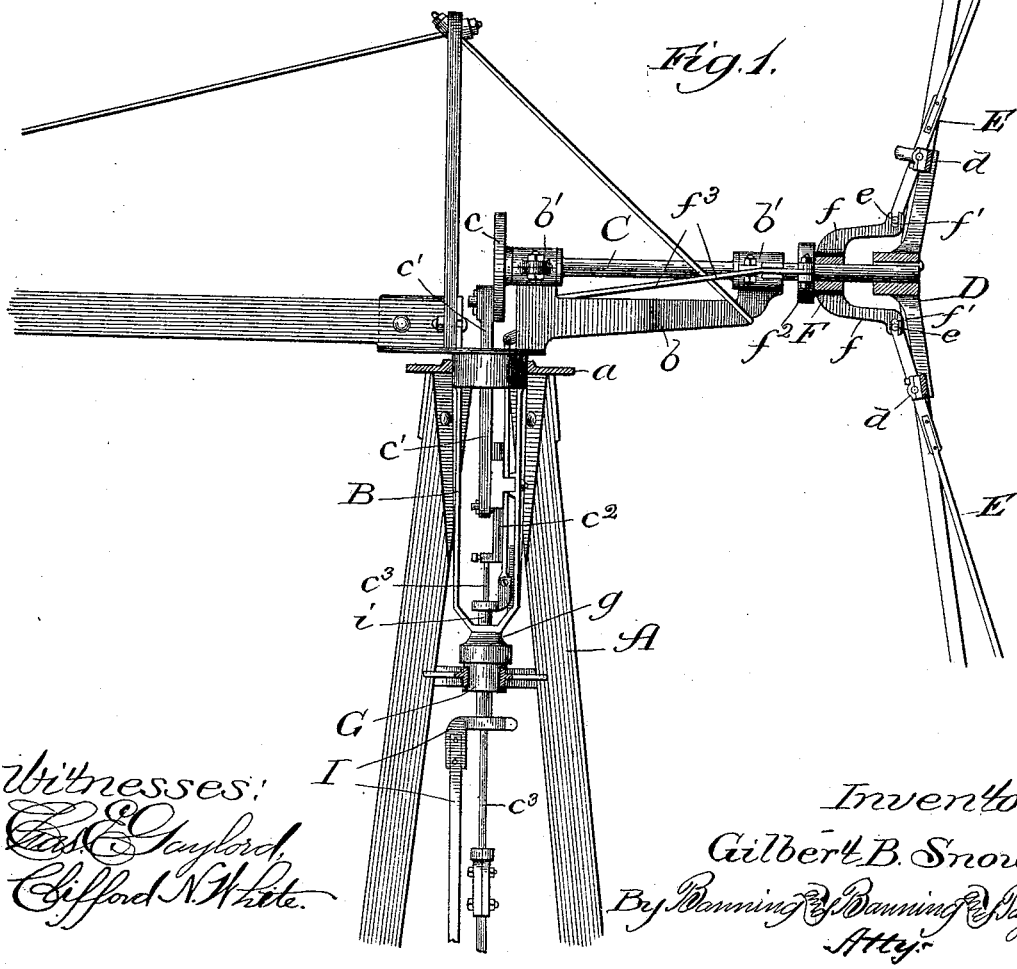
Witnesses:
Chas. E. Gaylord
Clifford N. White
Inventor:
Gilbert B. Snow,
By Banning & Banning & Payson
Atty.

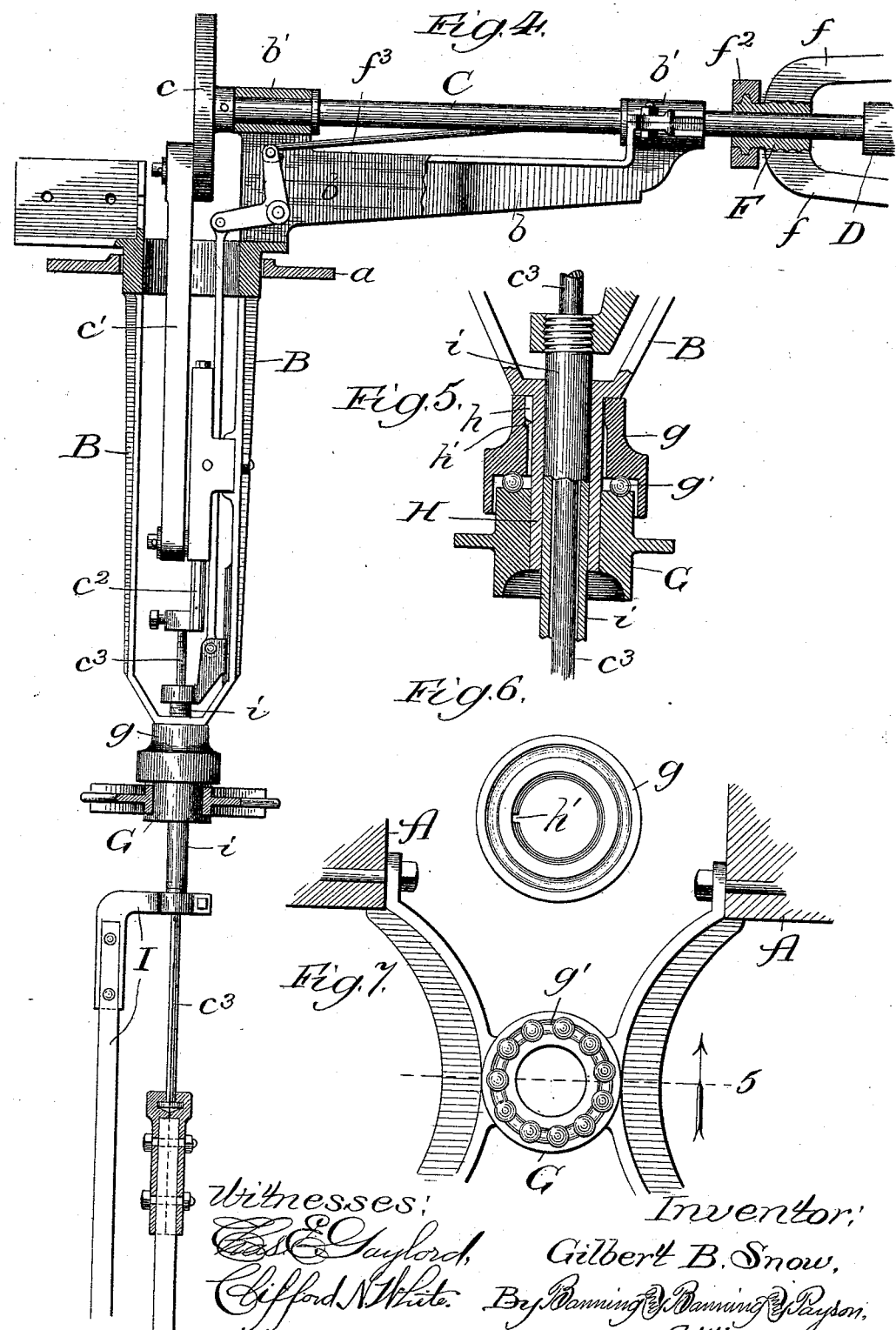

United States Patent Office.

GILBERT B. SNOW, OF ELGIN, ILLINOIS, ASSIGNOR TO THE ELGIN WIND POWER AND PUMP COMPANY, OF SAME PLACE.

WINDMILL.

SPECIFICATION forming part of Letters Patent No. 498,584, dated May 30, 1893.

Application filed April 18, 1892. Serial No. 429,634. (No model.)

*To all whom it may concern:*

Be it known that I, GILBERT B. SNOW, of Elgin, Kane county, Illinois, have invented a new and useful Improvement in Windmills, of which the following is a specification.

The object of my invention is to make a simple, economical and efficient wind-mill; and the invention consists in the features and combinations hereinafter described and claimed.

In the accompanying drawings, Figure 1 is a partial sectional elevation of part of the upper portion of a wind-mill provided with my improvements; Fig. 2 an inner face view of the spider detached; Fig. 3 an enlarged sectional view taken on line 3 of Fig. 2, showing one of the flat levers for shifting the sails in dotted lines; Fig. 4 an enlarged view, partially in section, of the working portion of the mill; Fig. 5 an enlarged sectional view of the ball bearing portion of the mill, taken on line 5 of Fig. 7; Fig. 6 a bottom plan view of the cap portion of the bearing; and Fig. 7 a plan view of the base or step portion of the bearing, showing the balls in place.

A is the tower, and $a$ a metallic ring or cap at the top thereof; B the main frame having a loose bearing in the ring $a$ and a ball bearing at its lower extremity, $b$ an outwardly extending arm or part thereof, and $b'$ boxes or bearings therein; C a horizontal shaft supported in the bearings $b'$, $c$ a crank or disk on its inner end, and $c'$ a pitman connected at one end to a pin on said crank or disk and at the other end to a sliding plate $c^2$, which forms its connection to the pump rod $c^3$; D the spider rigidly connected to the outer end of the shaft C, and $d$ boxes or bearings therein; E flat levers for operating the sails or fans, fulcrumed in the bearings $d$, and $e$ pins or turned portions at the inner ends thereof; F a sliding head loosely mounted on shaft C, provided with outwardly extending arms $f$, each having a slotted bearing $f'$ for pin $e$, $f^2$ a collar on the inner end of the sliding head connecting with operating rods or links $f^3$; G a base or support for the ball bearing, $g$ the cap portion thereof, and $g'$ the balls; H an extension of the main frame passing down through the cap $g$ and base G, $h$ a key on the upper end of the extended portion of the main frame, and $h'$ a key-way or slot in the cap $g$; I mechanism for shifting the sails, and $i$ a sleeve or tube connecting the upper end thereof to a rod attached to the bell crank.

The mechanism for shifting the sails of the wind wheel is connected at its upper end to a sleeve or tube, which passes through the lower bearing of the main frame, and on the upper end of this tube is attached a head, from which a rod extends upwardly to a bell crank fulcrumed in the arm $b$ of the frame, to one arm of which it is attached. To the other arm of the bell crank are attached operating rods or links $f^3$, which connect with the sliding head. As the construction and operation of these parts will be apparent from the drawings, further description thereof is considered unnecessary.

In wind-mills, as heretofore constructed, it has been found difficult, owing to friction, to provide a bearing for the main frame which would enable the mill to adapt itself to light and varying currents of wind. I overcome this objection by using an anti-friction ball bearing, at the lower end of the main frame, upon which the entire weight of the frame and mill rests. In making this ball bearing, I prefer to use as many balls as can be put into the circular space adapted to receive them without contact with each other, so as to leave them free and independent in their action. The balls may of course be of any size desired, and the number used will depend somewhat upon their size and the size of the mill to which they are applied. The cap portion of the ball bearing is loosely and adjustably attached to the main frame, the attachment being such as to permit of its free automatic adjustment with reference to the main frame and ball bearing. This causes the entire weight of the mill to rest on all the balls, at all times, without regard to its varying motions, or as to whether the main frame is exactly plumb, or the base or step plate level; and because of this the balls never flatten or lose their free rolling motion. This construction of ball bearing enables the mill to turn easily and adapt itself to the faintest change or current of air; and, as to this part, it renders the use of oil or lubricants unnecessary.

The extended portion of the main frame, which passes down through the cap portion and base of the ball bearing is so constructed that only a small part thereof comes in contact with said cap portion, and even this part fits loosely therein. This leaves the cap portion free to adjust itself with a uniform bearing on the balls at all times, as above described. To prevent the main frame from turning in the cap, a rib or projection may be cast on its lower extremity, adapted to fit loosely into a corresponding slot or groove in the cap. In this respect, however, the parts should be so constructed that while the main frame is prevented from turning in the cap, the latter, as above suggested, is free to adjust itself automatically with reference to the frame and ball bearing.

The spider, to which the arms of the wind wheel are attached, is cast with a continuous rim or web at the outer ends of the spokes. This rim or web is provided with lugs or ears adapted to receive the flat levers used to open and close the sails of the wind wheel, which are held in place therein by caps bolted to the web, these caps having semi-circular depressions to correspond with and fit over similar depressions in the lugs. This solid or continuous rim or web strengthens the spider, and affords a very substantial bearing for the flat levers, with little or no friction. The flat levers themselves are preferably made in two parts and riveted together outside the spider. The lower part is provided with a pin or spindle on each side, which rests in the bearing formed by the rim of the spider and cap bolted thereto, as above described. The lower end of the flat lever is provided with a pin or turned portion, which hooks into or engages with the slotted bearings of the sliding head. This head is cast in one piece, with outwardly extending arms, each having an elongated or slotted bearing to receive or engage with such pin or turned portion. This construction of sliding head and flat lever and engagement with the spider makes a very substantial coupling between the flat levers and sliding head, rendering displacement practically impossible, and at the same time reduces the number of joints and dispenses with additional parts—as links and bolts—and their attendant friction.

It will of course be understood that I do not intend to limit myself to minor features or details of construction, or to the use of all my improvements together in a single windmill. On the contrary, I intend to vary the form and construction, and to omit parts or use equivalents as circumstances may suggest or render expedient.

I claim—

1. In a wind-mill, the combination of a main frame, a ball bearing consisting of a number of separate disconnected balls arranged at the lower end of the main frame, and a loosely fitting cap surrounding such lower end and ball bearing, and automatically adjustable with reference thereto substantially as described.

2. In a wind-mill, a spider having a continuous rim or web at the outer end of the spokes, provided with lugs or ears having semi-circular depressions therein, and caps having corresponding depressions bolted to the web, substantially as described.

3. In a wind-mill, the combination of a spider having a continuous rim or web, a sliding head on the main shaft of the mill, provided with outwardly extending arms each having an elongated or slotted bearing at its end, and flat levers secured to the continuous rim, each having a pin or turned portion at its lower end inserted in the elongated bearing of the arm of the sliding head, substantially as described.

4. In a wind-mill, the combination of a sliding head and flat levers, each flat lever having a pin or spindle at each side for securing it to the spider, and a pin or turned portion at its lower end for connecting it to the sliding head, and automatically adjustable with reference thereto substantially as described.

5. In a wind-mill, the combination of flat levers to open and close the sails of the windwheel, and a sliding head cast in one piece with outwardly extending arms, each having an elongated bearing $f'$ to receive or engage with a portion of the flat lever, substantially as described.

GILBERT B. SNOW.

Witnesses:
ROBT. K. PLUMLEIGH,
JAS. G. SPILLARD.

It is hereby certified that in Letters Patent No. 498,584, granted May 30, 1893, upon the application of Gilbert B. Snow, of Elgin, Illinois, for an improvement in "Windmills," an error appears in the printed specification requiring correction, as follows: In lines 91-92, page 2, the clause "and automatically adjustable with reference thereto" should be stricken out; and that the Letters Patent should be read with this correction therein that the same may conform to the record of the case in the Patent Office.

Signed, countersigned, and sealed this 20th day of June, A. D. 1893.

[SEAL.]
JNO. M. REYNOLDS,

*Assistant Secretary of the Interior.*

Countersigned:

JOHN S. SEYMOUR,

*Commissioner of Patents.*